United States Patent [19]
Darneille

[11] Patent Number: 5,944,312
[45] Date of Patent: Aug. 31, 1999

[54] EDUCATIONAL GAME APPARATUS FOR LEARNING RELATIONSHIPS BETWEEN LIVING OR NON-LIVING THINGS

[76] Inventor: Diane D. Darneille, 7104 Loch Lomand Dr., Bethesda, Md. 20817-4760

[21] Appl. No.: 08/798,741

[22] Filed: Feb. 13, 1997

[51] Int. Cl.[6] .................................................. A63F 9/00
[52] U.S. Cl. ...................................... 273/157 R; 434/403
[58] Field of Search ............................... 273/153 R, 156, 273/157 R, 160; 434/403; 446/85

[56] References Cited

U.S. PATENT DOCUMENTS

| | | | |
|---|---|---|---|
| 550,563 | 11/1895 | Pierce | 434/403 |
| 2,314,387 | 3/1943 | Carlsson | 273/157 R |
| 2,386,114 | 10/1945 | Hayes | 434/403 |
| 2,483,833 | 10/1949 | Levin | 273/157 R |
| 3,547,444 | 12/1970 | Williams | 273/157 R |
| 4,158,921 | 6/1979 | Stolpen | 434/403 |
| 4,571,200 | 2/1986 | Serna | 446/85 |
| 4,715,605 | 12/1987 | Fritzman | 273/156 |
| 4,852,878 | 8/1989 | Merrill | 273/156 |

FOREIGN PATENT DOCUMENTS

| | | |
|---|---|---|
| 19751 | 2/1929 | Netherlands . |
| WO 86/06292 | 4/1985 | WIPO . |

*Primary Examiner*—Steven Wong
*Attorney, Agent, or Firm*—Larson & Taylor

[57] ABSTRACT

A game apparatus teaches relationships between members and subsets of a recognized set of living or non-living things, such as the five food groups, through illustrations on faces of geometrical-shaped blocks. The apparatus further includes coded indicia in the form of letters, numbers and colors which provide additional information by which children can recall relationships between the various members and subsets which are illustrated.

15 Claims, 4 Drawing Sheets

EDUCATIONAL GAME APPARATUS FOR LEARNING RELATIONSHIPS BETWEEN LIVING OR NON-LIVING THINGS

FIELD OF THE INVENTION

The present invention relates to an educational game apparatus and, more particularly, to a game for teaching children relationships between recognized sets of living or non-living things while improving other skills such as coordination, vocabulary and math.

BACKGROUND OF THE INVENTION

One of the most common toys enjoyed by children is building blocks. Basic building blocks are typically cube-shaped such that they are easily stackable. Often, the blocks include numbers, letters or pictorial representations on the sides.

Basic building blocks have further been modified for use in more complex puzzles and games. For example, U.S. Pat. No. 4,852,878 to Merrill discloses a game which utilizes eight detached playing blocks having different indicia sequences. The indices in each sequence have both a numerical character and a directional character. For example, in one embodiment, the indices are represented by the configuration of a drop, a heart, a crown, a clover, a star and a lightening bolt. The drop represents a numerical value of one and the apex in the drop determines the direction. The heart represents a numerical value of two in accordance with the two lobe portions and also has a direction based on its apex. The remaining indices are assigned numerical and directional values in accordance with the same pattern. Various games can thus be played by arranging the blocks according to the directional and/or numeric characteristics of the blocks.

U.S. Pat. No. 4,158,921 to Stolpen discloses the use of blocks for teaching relationships, similarities and differences in a number of subject matters. Each block includes at least two sets of indicia which bear a relationship to one another such that manipulation of the block discloses the relationship between the indicia or lack thereof.

While the aforementioned patents disclose blocks which are useful in learning relationships between individual elements, each side of the block bearing a representation of a single element, these patents do not disclose the use of blocks to teach relationships between subsets and members of subsets of a recognized set of living or non-living things.

SUMMARY OF THE INVENTION

Thus, it is the purpose of the present invention to overcome the disadvantages of the prior art and thereby provide a game apparatus for learning relationships between members of a recognized set of living or non-living things, each of the members having a first feature common to all members such that the members are identifiable with the recognized set and having a second feature which is not common to any other members such that the members are distinguishable from one another.

In accordance with a preferred embodiment of the invention, the apparatus includes a game piece comprising an enclosed geometrical-shaped block having a plurality of faces bearing illustrations consisting of members of a recognized set of living or non-living things. One face of the block bears an illustration of at least one member belonging to a first subset of the recognized set. A second face bears an illustration of at least two different members of a second subset.

In another preferred embodiment of the invention, the game apparatus includes stackable game pieces, each comprising an enclosed geometrical-shaped block having a plurality of faces for bearing illustrations consisting of members and subsets of a recognized set of living or non-living things. At least one of the faces of the block bears, in addition to the illustration, at least two different types of coded indicia which are identifiable with the illustrated member. The game pieces are thereby arrangeable in different patterns according to the illustrations and the coded indicia which typically consists of numbers, letters or colors.

In still another preferred embodiment of the invention, an educational game for teaching children human nutritional needs comprises at least one enclosed geometrical-shaped block having at least five faces for illustrating foods thereon. The first face bears an illustration of at least two different foods from one of the five food groups. A second face bears an illustration of at least one food from a food group other than the food group illustrated on the first face. A third face bears an illustration of either a sugar or fat, such as candy or butter, or a combination of at least two foods from different food groups. Preferably, where a combination of food groups is shown, that combination is in the form of a healthy meal.

It is, therefore, an object of the present invention to provide a game apparatus comprising stackable blocks which may be arranged in different patterns according to both illustrations and coded indicia on faces thereof.

It is another object of the invention to provide a game apparatus comprising stackable blocks which include both pictorial illustrations and numeric, letter and/or color indicia related to the pictorial representation to thereby provide a self-correcting teaching device.

It is yet another object of the present invention to provide an educational game for teaching children the five food groups and how to combine members of the food groups to create a balanced diet.

These and other objects of the present invention will become apparent from the detailed description to follow.

BRIEF DESCRIPTION OF THE DRAWINGS

There follows a detailed description of the preferred embodiments of the present which are to be taken together with the accompanying drawings wherein.

DETAILED DESCRIPTION OF THE PREFERRED EMBODIMENTS

Referring now to the figures, like elements are represented by like numerals throughout the several views.

Figure 1:
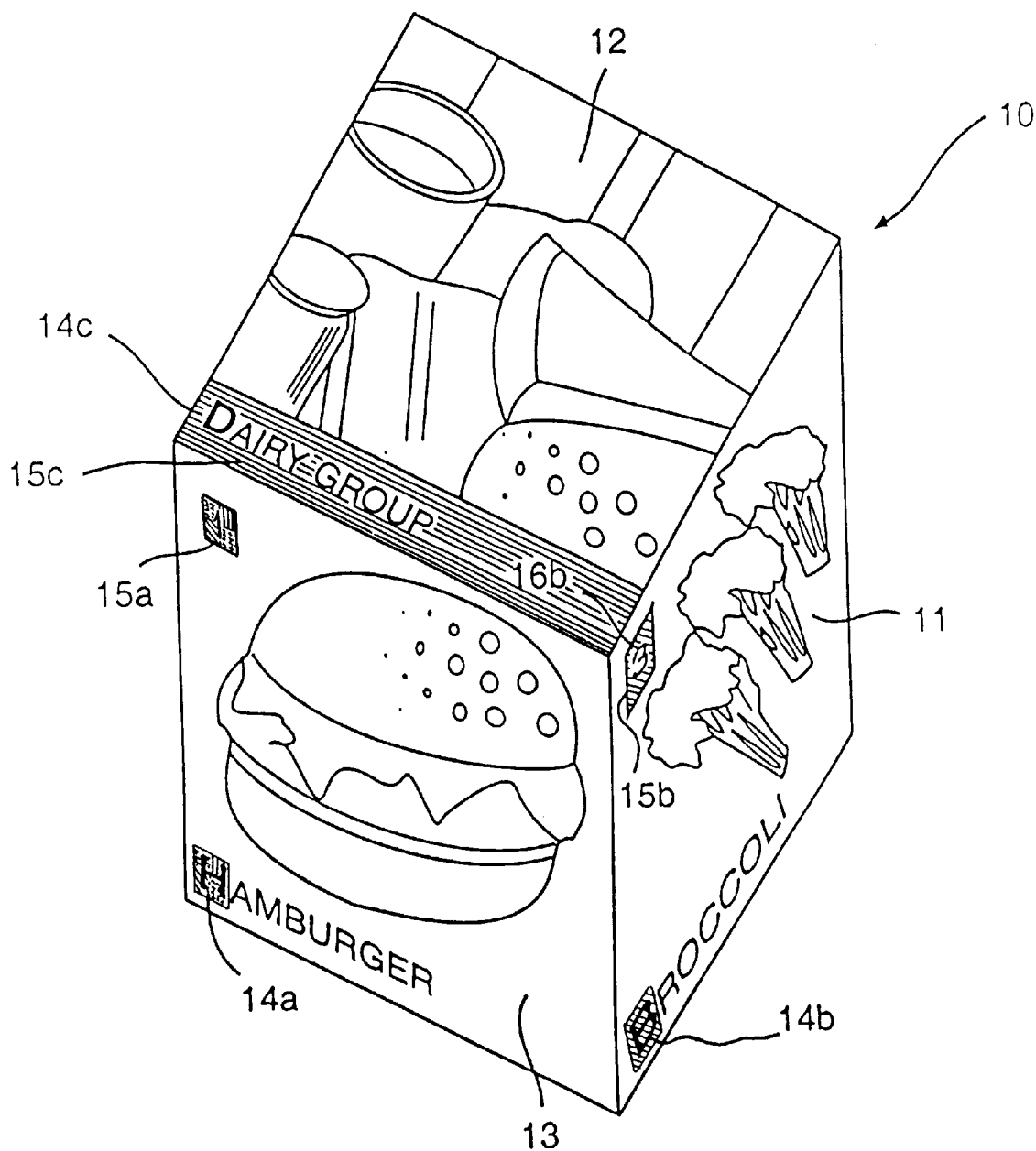
FIG. 1 is a perspective view of a game piece used in the game apparatus of the invention.

The game apparatus of the invention includes at least one game piece 10 as shown in FIG. 1. As shown, the game piece 10 is cube-shaped, i.e., a block with six faces. However, the game piece may have any number of geometric shapes. Preferably, the shape is such that the game piece 10 may be stacked with other similar game pieces. For example, the top and bottom of the game pieces may be triangular-shaped such that there three additional sides for a total of five faces, or the top and bottom may be octagonal-shaped such that there are eight additional sides for a total of ten faces.

The game apparatus of the invention is designed to teach relationships between members of a recognized set of living or non-living things. For example, as shown in FIGS. 1–5, the recognized set may be foods. Other examples of recognized sets include living creatures, forms of transportation, etc. Each of the respective members of these sets have at least one feature in common which makes the members identifiable with the recognized set. For example, with respect to food, a common feature is that the members of the food groups are all edible, i.e., recognized as being sold in grocery stores and served at restaurants for human consumption. It is also readily apparent that each member of the respective recognized set has at least one feature which is not common to any other member of that set such that the members are distinguishable from each other. Typically, this feature is simply visual appearance. The members in each recognized set will further include yet another feature shared in common with some, but not all of the members, such that the set is divisible into a grouping of subsets wherein no two subsets contain a common member. In the case of foods, for example, it is possible to separate individual food products into subsets based on the known food groups: grain, vegetable, dairy, fruit, and meat/protein. Similarly, where the recognized set is living creatures, one grouping could be divided into the known subsets of reptiles, mammals, amphibians, etc.

Regardless of the shape of the game piece 10, the embodiment shown in FIG. 1 includes a first face 11 which bears an illustration of at least one member belonging to a first subset of a defined grouping of the recognized set of living or non-living things. As explained above, FIG. 1 shows a game piece 10 having illustrations of the recognized set of foods, the grouping being the five major food groups. Thus, face 11 bears an illustration of a single vegetable, i.e., broccoli, which is a member of a first subset, i.e., the vegetable group.

Regardless of the shape of the game piece 10, in the embodiment of FIG. 1, a second face also bears an illustration of at least two members of a single subset of the defined grouping of the recognized set of living or non-living things. As shown, face 12 includes an illustration of several members from a different subset, the dairy group, namely cheeses, milk and yogurt. However, both faces 11 and 12 could illustrate members from the same subset. For example, in the embodiment shown, face 12 could illustrate several members of the vegetable group. Further, each of the remaining faces of the game piece 10 could also illustrate a vegetable.

The game piece 10 may further include a third face 13 which bears an illustration of at least two members of the recognized set, each of the members belonging to a different subset within the selected grouping. As depicted in FIG. 1, face 13 shows members of the grain, meat/protein, and vegetable groups, i.e., a bun, hamburger, and lettuce and tomato, respectively. Where the recognized set is foods, it is also desirable, as shown in FIG. 1, that the third face depicts the members belonging to different food groupings in a form of a meal. Thus, from face 13 of game piece 10, a child can learn that by eating a hamburger on a bun with lettuce and tomato, he has satisfied at least a portion of the requisite daily servings from the grain, vegetable and meat/protein food groups.

In addition to illustrations of members of the recognized set of living or non-living things, the game piece 10 of the invention may further include coded indicia on one or more of the faces. This coded indicia is typically related to the illustration on the respective face. In the embodiment shown in FIG. 1, each of faces 11, 12 and 13 includes the spelling of the member of the food group, or the food group itself in the case of face 12. Further, the first letter 14a, b, c of each of these names is shown in bold. This assists children in learning to read and spell and, for very young children, helps them to learn the alphabet. In this regard, in another preferred embodiment of the invention shown in FIG. 2, the game apparatus includes more than one game piece each having at least one face bearing an illustration of at least one member of a grouping of the recognized set and, on the same face, at least two different types of coded indicia identifiable with the illustrated member. The game pieces 20a–g are arrangeable in different patterns according to the illustrations and the coded indicia.

Figure 2:
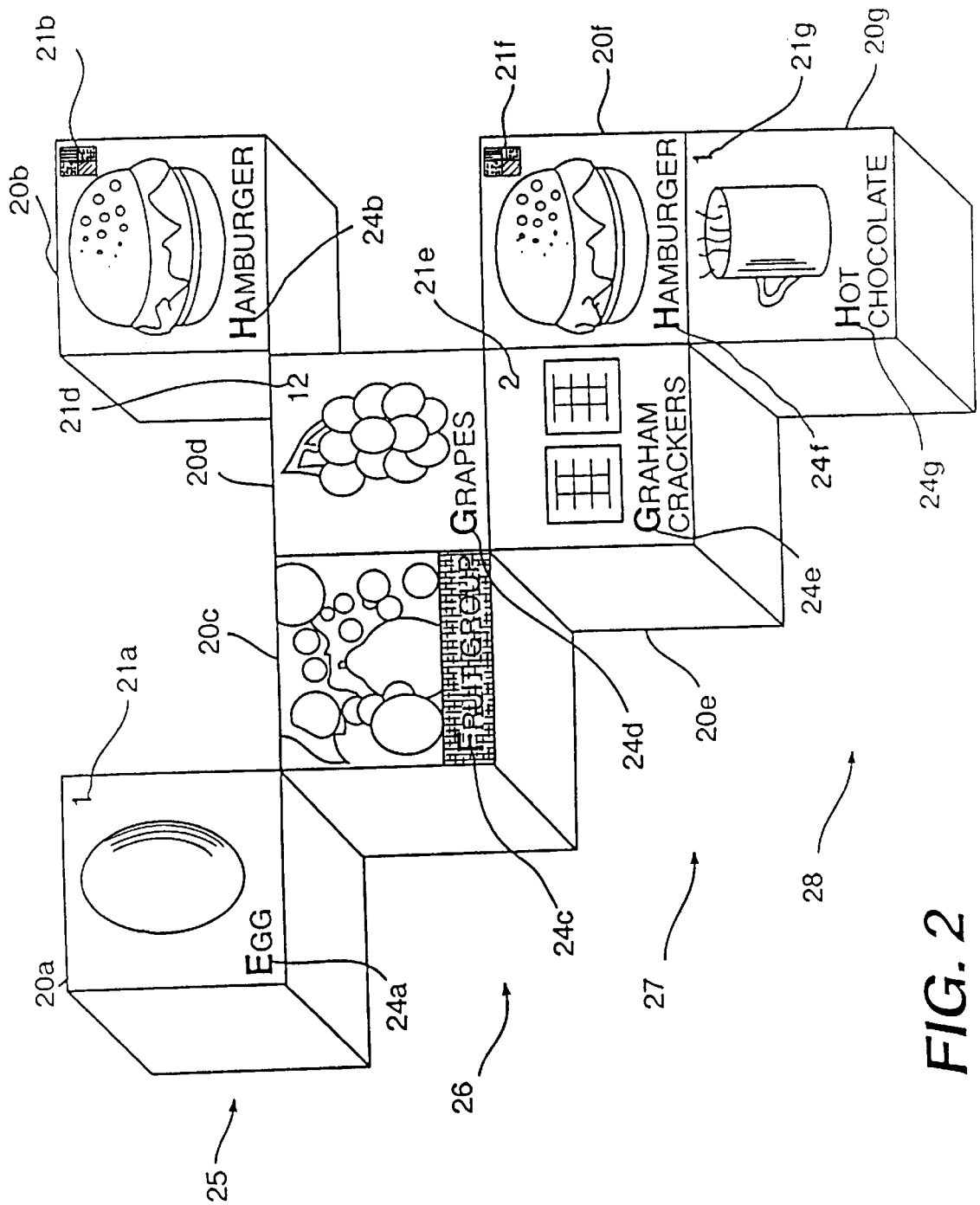
FIG. 2 shows an arrangement of multiple game pieces in the game apparatus of the invention for teaching members of the five food groups as well as the alphabet.

In the embodiment shown in FIG. 2, the game pieces are arranged alphabetically from left to right and top to bottom based on the first letter 24a–g in the name of the illustrated member or subset. In addition, the game pieces 20a–g, are arranged such that only members of the same food group are in any one row 25, 26, 27, 28. Specifically, row 25 depicts members of the meat/protein group, row 26 depicts members of the fruit group, row 27 depicts members of the grain group, and row 28 depicts members of the dairy group. Of course, the hamburger illustrated in game pieces 20b and 20f includes members of the meat/protein, fruit, vegetable and grain groups and thus is properly arranged in both rows 25 and 27.

Each game piece 20a–g may also include coded indicia which serves a self-correcting purpose. For example, referring back to FIG. 1, the left-hand corners of faces 11, 13 include colored squares 15a and 15b, respectively. These colored squares 15a, b, preferably indicate the subsets to which the illustrated members belong. Thus, for example, square 15b might have a green color indicating that broccoli is a member of the vegetable group. Since face 13 depicts members from several different food groups, square 15a would have a combination of different colors corresponding to each group illustrated, such as green for lettuce and tomato (the vegetable group), red for hamburger (the meat/protein group) and yellow for the bun (the grain group). Preferably, the squares also indicate the number of servings. Thus, square 15a would include two yellow areas indicating that a bun provides two servings from the grain group, plus one green area and one red area. With regard to the face 12 which shows several members of a single subset, at least some portion of face 12, preferably rectangular area 15c is shown in the color identified with the subset depicted, for example, blue in the case of the dairy group.

The color coding helps children easily remember the subset to which the member depicted belongs. When arranging blocks in the manner shown in FIG. 2, for example, if a child cannot remember whether an egg, depicted in game piece 20a is a member of the dairy or meat/protein groups, he can simply look to the color coded indicia provided somewhere on block 20a which identifies that an egg is a member of the meat/protein group. In this way, the color coded indicia acts as a self-correcting tool.

Figure 3:
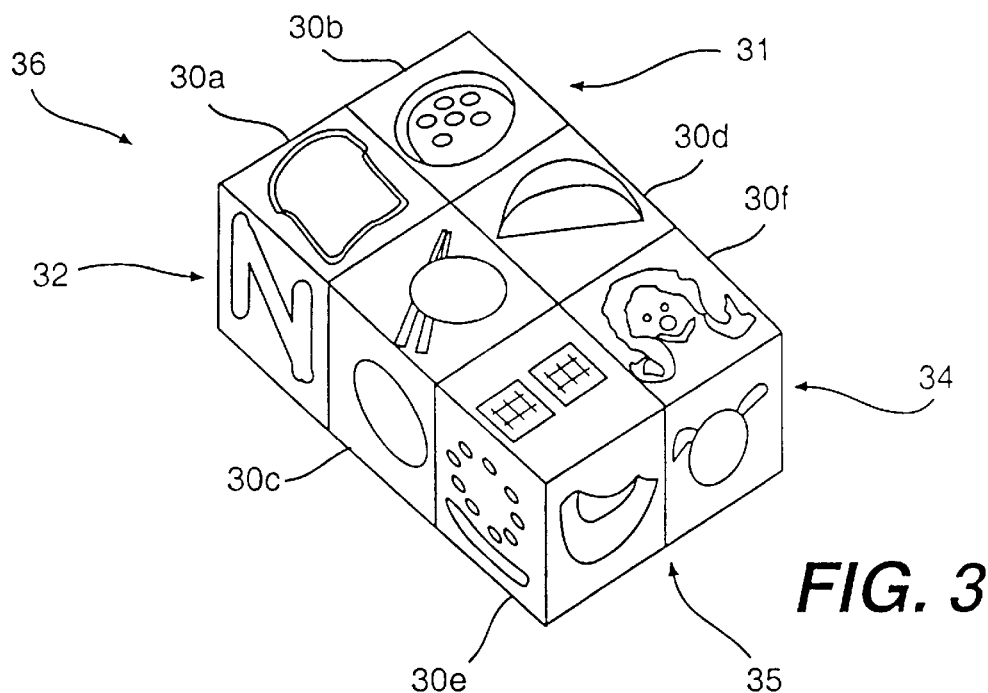
FIG. 3 shows an arrangement of the game pieces of the game apparatus of the invention in an arrangement used to learn the proper combination of food servings for a balanced daily diet.

FIG. 3 shows how the game apparatus of the invention is particularly useful in teaching children a balanced diet. In FIG. 3, game pieces 30a–f have been arranged to form a rectangular shape such that the top 31 of the rectangle depicts six different members of the grain group. The side 32 depicts three different vegetables, side 34 depicts three dairy products (not shown), end 35 depicts two fruits and the end 36 depicts two meat/protein items (not shown). This ratio 6:3:3:2:2 is identical to the recommended number of servings from the grain group, dairy group, vegetable group, fruit group and meat/protein group for a balanced daily diet of children. In this regard, each of the game pieces 30a–f preferably further include coded indicia relating to serving sizes.

Figure 4:
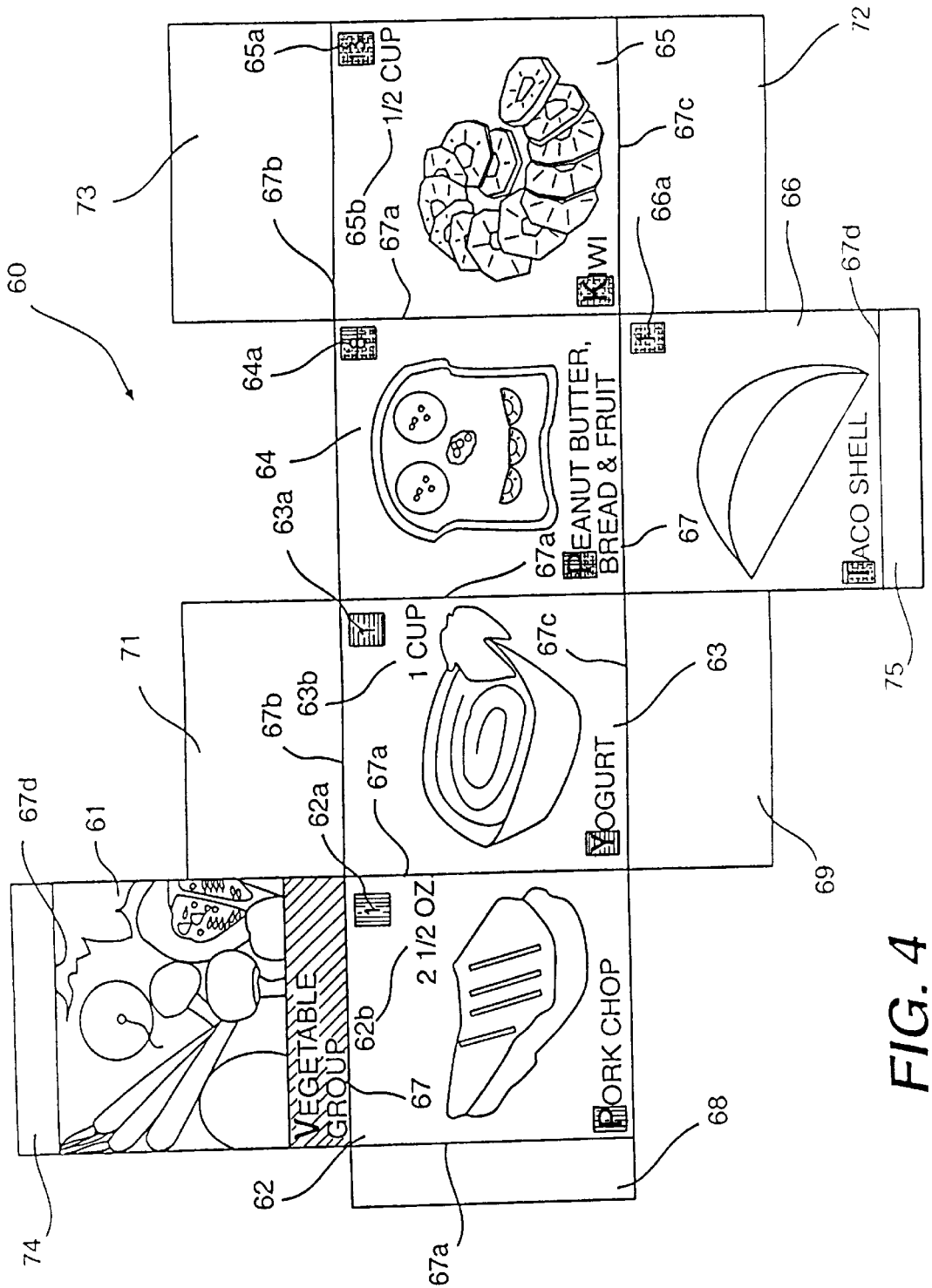
FIG. 4 shows a game piece in the shape of a cube which has been disassembled to show all six faces.

Referring to FIG. 4, a game piece 60 has been disassembled to show all six faces 61–66. The right-hand corners of faces 62–66 includes a number 62a, 63a, 64a, 65a, 66a, respectively, which indicates the quantity of the food depicted which must be eaten in order to satisfy a single serving requirement. For example, numeral 65a is a "13," which indicates that thirteen slices of kiwi must be eaten in order to satisfy a single serving requirement from the fruit group. Directly below numeral 65e, the equivalent serving size 65b is indicated as about ½ cup. An indication of a serving size is particularly useful where the member depicted is typically served in a bowl or a glass, for example, a one cup serving size 63b of yogurt as depicted on face 63 equals one serving size requirement (numeral 63a) from the dairy group. Similarly, face 62 indicates that a 2½ ounce serving size 62b of a pork chop must be consumed to satisfy a single serving requirement (numeral 62a) from the meat/protein group. The illustrations on the game piece faces 62–66 may also be correlated to the numerals 62a, 63a, 64a, 65a, 66a. For example, the numeral 65a is a "13" and thirteen slices of kiwi are shown on face 65. In FIG. 1, numeral 16b is a "3" and three pieces of broccoli are shown on face 11. Thus, the game apparatus of the invention is also useful in helping children learn to count.

Of course, there are many possible coded indicia which may be included on the faces of the game pieces depicted in FIGS. 1–4 thereby allowing the game pieces to be arranged in different ways for teaching children different relationships between the members of the recognized set of living or non-living things which is depicted on the faces of the game pieces.

With respect to teaching children about food groups, the game piece depicted in FIG. 4 shows a most preferred embodiment in which one face 61 shows several members of a single food group. A second face 64 shows members from different food groups other than the food group represented on face 61 and, further, depicted in the form of a healthy meal. Alternatively, face 64 may depict a sugar or fat, such as candy or butter, with an "X" across the face indicating that intake of such foods should be minimized. Finally, remaining faces 62, 63, 65 and 66 each depict a member from the remaining four food groups, i.e., the food groups not shown on face 61.

As explained above with respect to FIG. 1, the game piece may have any number of configurations. However, the preferred configuration is that of a cube. Referring more particular to FIG. 4, for ease of manufacture, the game pieces 60, 70 are preferably constructed from a heavy weight paper or cardboard which is bendable into a cube shape. In the assembled state shown in FIG. 5, the top 40 and bottom 41 are identical, with two flaps 42, 43 extending from the edges of opposite sides 44, 45, respectively, and foldable into the center of the cube. A third flap 46, attached to side 47 folds down over the flaps 42, 43 and tucks into the side 48 to form an enclosed shape. Similar flaps (not shown) are used to enclose the bottom 41.

In order to provide additional support to the game piece 10, an insert 49 preferably formed of corrugated cardboard, is inserted into the interior of the cube. The insert 49 is formed by folding a rectangular-shaped piece of cardboard having a length of approximately four times the width of each side plus the length of the diagonal of one of the sides 44, 45, 47, 48 or top 40 or bottom 41, all of which have equal length and width dimensions d. Thus the length of the insert 49 is approximately equal to $d \times (4+\sqrt{2})$ and the width is approximately equal to d. The insert 49 is then folded lengthwise into five sections, the first four sections being shaped to match the sides 44, 45, 47, 48 of the cube and the fifth side extending between adjacent corners of sides 44, 48 and sides 45, 47. The diagonal edges 50, 51 of insert 49 thus form a support for the flaps 42, 43, 46 of the top side 40 and the flaps (not shown) of the bottom side 41.

Figure 5:
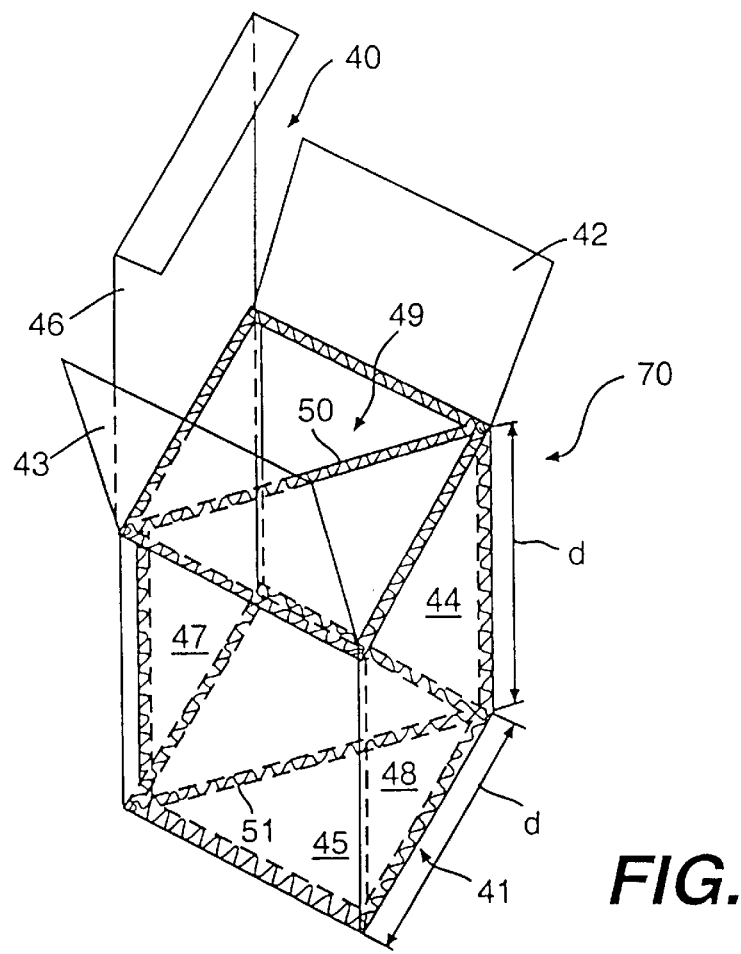
FIG. 5 shows the preferred construction of a game piece of the game apparatus of the invention.

FIG. 4 shows how a game piece 60 may be constructed from a flat sheet of cardboard and then folded along fold lines 67 to form the enclosed shape shown in FIG. 5. The enclosed shape is preferably formed by first positioning adjacent faces 62/63, 63/64, 64/65 and 65/62 at 90° angles relative to one another by forming folds along fold lines 67a. Flap 68 may then be secured to the back side of face 65 by means of an adhesive, top flaps 71, 73 are then folded toward one another along fold lines 67b and bottom flap 69, 72 are folded toward one another along fold lines 67c. Top and bottom faces 61, 66 may then be folded down over the flaps 71, 73 and 69, 72, respectively, and flaps 74, 75 tucked into sides 64, 62, respectively, by folding along fold lines 67d to form an enclosed cube shape. Other manufacturing methods may, of course be utilized to construct the game pieces of the invention.

Although the invention has been described in considerable detail with respect to preferred embodiments thereof, variations and modifications will be apparent to those skilled in the art without departing from the spirit and scope of the invention as set forth in the claims.

I claim:

1. A game apparatus for learning relationships between members of a recognized set of living or non-living things, each of said members having at least a first feature common to all members whereby said members are identifiable with said recognized set and having at least a second feature which is not common to any other member whereby said members are distinguishable from each other, said set being divisible into different groupings of subsets, each of the subsets within one of said groupings including members having a third feature in common but which is not common to members in any other subset in the same grouping, said apparatus including a game piece comprising an enclosed geometrical-shaped block having a number of faces bearing illustrations consisting of members of only one of said groupings, a first of said faces bearing an illustration of at least one member belonging to a first subset of said one grouping, and a second of said faces bearing an illustration of at least two different members from a single subset of said one grouping, adjacent illustrated faces having at least one feature in common and one feature which is different, no two adjacent illustrated faces having illustrations with the same identical relationship to any other pair of adjacent illustrated faces.

2. The game apparatus according to claim 1 wherein said two different members are from a second subset.

3. The game apparatus according to claim 1 wherein said game piece further comprises a third face bearing an illustration of at least two different members, each of said two members belonging to a different subset in said one grouping.

4. The game piece according to claim 1 wherein said one grouping comprises food groups and said subsets comprise dairy products, vegetables, meats/proteins, fruits, grains, and sugars/fats.

5. The game apparatus according to claim 1 wherein said game piece includes coded indicia on at least one of said sides.

6. The game apparatus according to claim 5 wherein said coded indicia is selected from the group consisting of numbers, letters and colors.

7. The game apparatus according to claim 1 further comprising additional game pieces, each of said game pieces having at least one different illustration than another one of said game pieces.

8. The game apparatus according to claim 7 wherein said game pieces further include coded indicia on at least one of said sides, such that said game pieces are arrangeable in different ways according to said illustrations and said coded indicia.

9. The game apparatus according to claim 1 wherein an interior of each of said game pieces includes an insert lying adjacent each of said faces for preventing deformation of said faces.

10. A game apparatus for learning relationships between members of a recognized set of living or non-living things, each of said members having at least a first feature common to all members whereby said members are identifiable with said recognized set and having at least a second feature which is not common to any other member whereby said members are distinguishable from each other, said set being divisible into different groupings of subsets, each of the subsets within one of said groupings including members having a third feature in common but which is not common to members in any other subset in the same grouping, said apparatus comprising stackable game pieces, each comprising an enclosed geometrical-shaped block having a number of faces bearing illustrations consisting of members of only one of said groupings, at least one of said faces bearing an illustration of one of said members and coded indicia identifiable with the illustrated member, whereby said game pieces are arrangeable in different patterns according to said illustrations and said coded indicia, adjacent illustrated faces having at least one feature in common and one feature which is different, no two adjacent illustrated faces on a block having the same identical combination of illustrations and coded indicia as any other pair of adjacent illustrated faces.

11. The game apparatus according to claim 10 wherein said coded indicia is selected from the group consisting of numbers, letters and colors.

12. The game apparatus according to claim 10 wherein each of said game pieces includes a first face bearing an illustration of at least one member belonging to a subset of said one grouping, and a second face bearing an illustration of at least two different members from a single subset of said one grouping.

13. The game apparatus according to claim 10 wherein at least one face on each of said game pieces includes at least two types of coded indicia identifiable with the illustrated member.

14. The game apparatus according to claim 10 wherein each of said game pieces has at least one different illustration than another one of said game pieces.

15. The game apparatus according to claim 10 wherein an interior of each of said game pieces includes an insert lying adjacent each of said faces for preventing deformation of said faces.

\* \* \* \* \*